(12) United States Patent
Anno

(10) Patent No.: US 8,150,799 B2
(45) Date of Patent: Apr. 3, 2012

(54) DOCUMENT MANAGEMENT APPARATUS, DOCUMENT MANAGEMENT METHOD AND COMPUTER READABLE STORAGE MEDIUM

(75) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 12/478,472

(22) Filed: Jun. 4, 2009

(65) Prior Publication Data

US 2009/0307195 A1 Dec. 10, 2009

(30) Foreign Application Priority Data

Jun. 6, 2008 (JP) .................................. 2008-149362

(51) Int. Cl.
*G06F 7/00* (2006.01)
(52) U.S. Cl. ........................................ 707/608; 705/7.15
(58) Field of Classification Search ........................ None
See application file for complete search history.

(56) References Cited

U.S. PATENT DOCUMENTS

| | | | | |
|---|---|---|---|---|
| 6,697,821 B2* | 2/2004 | Ziff et al. | ...................... | 707/706 |
| 7,356,611 B1* | 4/2008 | Stork et al. | ...................... | 709/239 |
| 7,398,281 B2* | 7/2008 | Atchison et al. | ............. | 707/608 |
| 7,788,217 B2* | 8/2010 | Bennett, Jr. | ................... | 707/608 |
| 7,849,053 B2* | 12/2010 | Wolff et al. | .................... | 707/608 |
| 2004/0068424 A1* | 4/2004 | Lee et al. | ........................... | 705/7 |
| 2004/0117784 A1* | 6/2004 | Endoh | ............................ | 717/169 |
| 2004/0186762 A1* | 9/2004 | Beaven et al. | ................... | 705/8 |
| 2005/0024674 A1* | 2/2005 | Fujishige et al. | ............. | 358/1.14 |
| 2006/0010135 A1* | 1/2006 | Takano et al. | .................. | 707/10 |
| 2006/0080432 A1* | 4/2006 | Spataro et al. | ................ | 709/224 |
| 2007/0168870 A1* | 7/2007 | Wada | ............................. | 715/741 |
| 2007/0239713 A1* | 10/2007 | Leblang et al. | .................. | 707/6 |
| 2008/0077530 A1* | 3/2008 | Banas et al. | .................... | 705/50 |
| 2009/0319544 A1* | 12/2009 | Griffin et al. | .................. | 707/100 |

FOREIGN PATENT DOCUMENTS

JP 2006-185020 A 7/2006

\* cited by examiner

*Primary Examiner* — Neveen Abel-Jalil
*Assistant Examiner* — Daniel Kinsaul
(74) *Attorney, Agent, or Firm* — Canon USA Inc. IP Division

(57) ABSTRACT

A document management apparatus is provided in a system that includes a project management unit capable of managing progress of a project to which a user belongs. The document management apparatus includes a reception unit configured to receive a search keyword input by the user and user attribute thereof, a search unit configured to search document information based on the search keyword received by the reception unit, an obtaining unit configured to detect the project to which the user belongs based on the user attribute received by the reception unit, and obtain a phase of the detected project from the project management unit, an extraction unit configured to extract document information which is operated on a number of times that is equal to or more than a threshold value in the project phase obtained by the obtaining unit, from the document information searched by the search unit, and an output unit configured to output the document information searched by the search unit and the document information extracted by the extraction unit to provide the user therewith.

7 Claims, 11 Drawing Sheets

501 DOCUMENT

502 — Tbl-01 (DOCUMENT MANAGEMENT TABLE)

| ATTRIBUTION NAME | VALUE |
|---|---|
| DOCUMENT ID | 0123 |
| DOCUMENT NAME | File_AAA |
| USAGE TABLE | Tbl-02 |
| ... | |

503 — Tbl-02 (USAGE TABLE)

| | OPERATION 1 | OPERATION 2 | OPERATION 3 | ... |
|---|---|---|---|---|
| PHASE 1 | 15 | 8 | 1 | |
| PHASE 2 | 4 | 10 | 4 | |
| PHASE 3 | | | | |
| PHASE 4 | | | | |
| ... | | | | |

FIG.6

603 — Tbl-04 (RELATED DOCUMENT TABLE)

| RELATED DOCUMENT NAME | WEIGHTING | USAGE TABLE |
|---|---|---|
| ABCD | 4 | Tbl-02-1 |
| EFGH | 1 | Tbl-02-2 |
| IJKL | 1 | Tbl-02-3 |
| MNOP | 8 | Tbl-02-4 |
| ... | | |

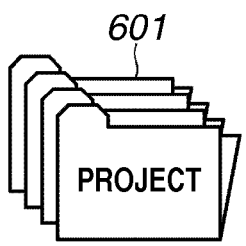

601 PROJECT

602 — Tbl-03 (PROJECT MANAGEMENT TABLE)

| ATTRIBUTION NAME | VALUE |
|---|---|
| PROJECT ID | PRJ-001 |
| PROJECT NAME | Project-X |
| RELATED DOCUMENT TABLE | Tbl-04 |
| USAGE SUMMARY TABLE | Tbl-05 |
| KEYWORD SUMMARY TABLE | Tbl-06 |
| TEMPLATE INITIAL - USAGE TABLE | Tbl-07 |
| TEMPLATE INITIAL - KEYWORD TABLE | Tbl-08 |
| TEMPLATE PERFORMANCE - USAGE TABLE | Tbl-09 |
| TEMPLATE PERFORMANCE - KEYWORD TABLE | Tbl-10 |
| ... | |

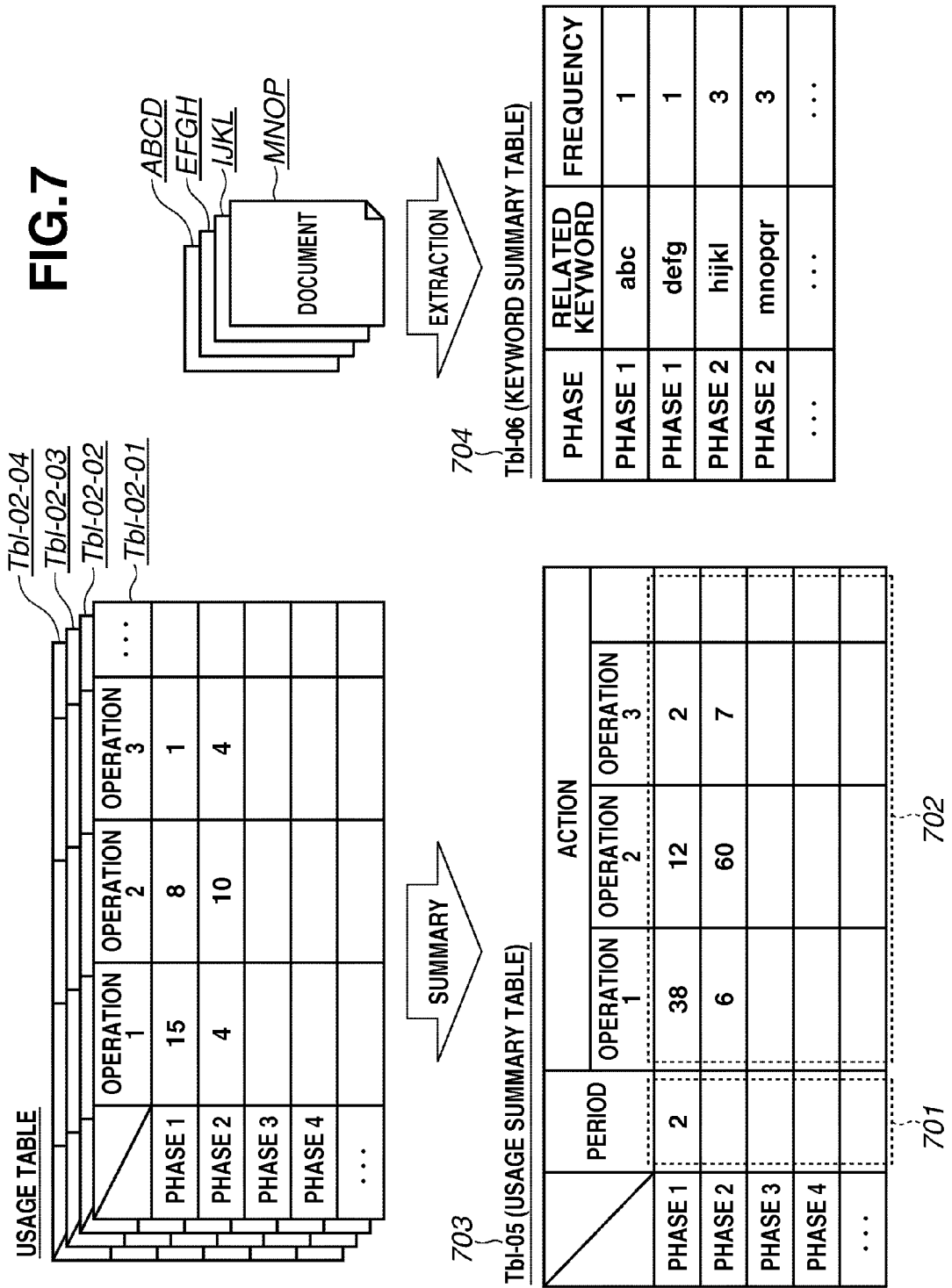

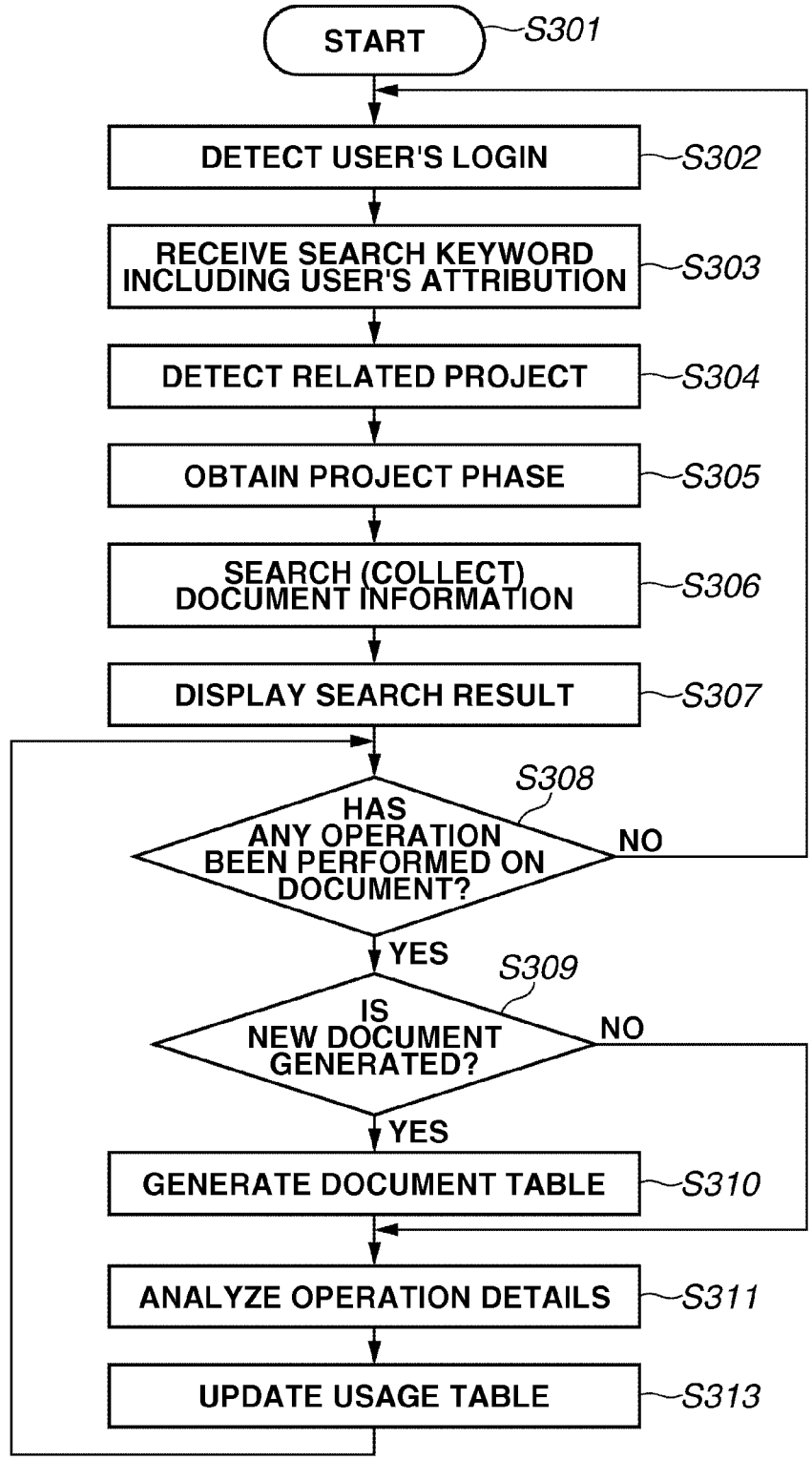

DOCUMENT MANAGEMENT APPARATUS, DOCUMENT MANAGEMENT METHOD AND COMPUTER READABLE STORAGE MEDIUM

BACKGROUND OF THE INVENTION

1. Field of the Invention

The present invention relates to a document management apparatus that stores and manages document information, as well as a method and computer readable storage medium therefor.

2. Description of the Related Art

A document management apparatus can store a great amount of document information available for a large number of users. Conventionally, the document information is classified into a folder structure according to a user of the document management apparatus. When the user handles the document information stored in the document management apparatus, the user can search for the target document information by a folder name. Further, by using a search function of an operation system (OS) or an application, the user can search for a keyword included in a name, type, and edition date of the document information, as well as in a text in a document, to find the target document information.

Further, Japanese Patent Application Laid-Open No. 2006-185020 discusses a conventional technique for displaying event information within a certain range of time including a registration date or an update date of a searched document, as well as results of searching the document based on a keyword specified by a user. The event information refers to various types of events such as a conference, a discussion for materials, an arrangement, a product test, and various types of meetings. The technique discussed in Japanese Patent Application Laid-Open No. 2006-185020 enables a user to re-search and to narrow down the search of the document based on the event information.

Meanwhile, for users involved in a product development project for a manufacturer, it is desirable that a past project including similar development phases can be referred to for information such as ways to prepare materials. More specifically, in a planning phase in the early stage of a project, a specification that summarizes a user's requests and analytical data concerning an external environment are frequently referred to, or newly generated. Further, in the succeeding designing phase, a product design document is frequently referred to or newly generated.

However, the above-described conventional technique does not focus on project work which is done in similar phases, and thus does not discuss any means for promoting efficiency in document information search for project work.

SUMMARY OF THE INVENTION

According to an aspect of the present invention, a document management apparatus is provided in a system that includes a project management unit capable of managing progress of a project to which a user belongs. The document management apparatus includes a reception unit configured to receive a search keyword input by the user and user attribute thereof, a search unit configured to search document information based on the search keyword received by the reception unit, an obtaining unit configured to detect the project to which the user belongs based on the user attribute received by the reception unit, and obtain a phase of the detected project from the project management unit, an extraction unit configured to extract document information which is operated on a number of times that is equal to or more than a threshold value in the project phase obtained by the obtaining unit, from the document information searched by the search unit, and an output unit configured to output the document information searched by the search unit and the document information extracted by the extraction unit to provide the user therewith.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 illustrates an example of a management table of information about a project in a project DB.

FIG. 7 illustrates an example of details of generating a summary table by using management tables illustrated in FIGS. 5 and 6.

FIG. 11 is a flowchart illustrating example processing performed by the document management apparatus.

DETAILED DESCRIPTION OF THE EMBODIMENTS

Various exemplary embodiments, features, and aspects of the invention will be described in detail below with reference to the drawings.

Figure 1:
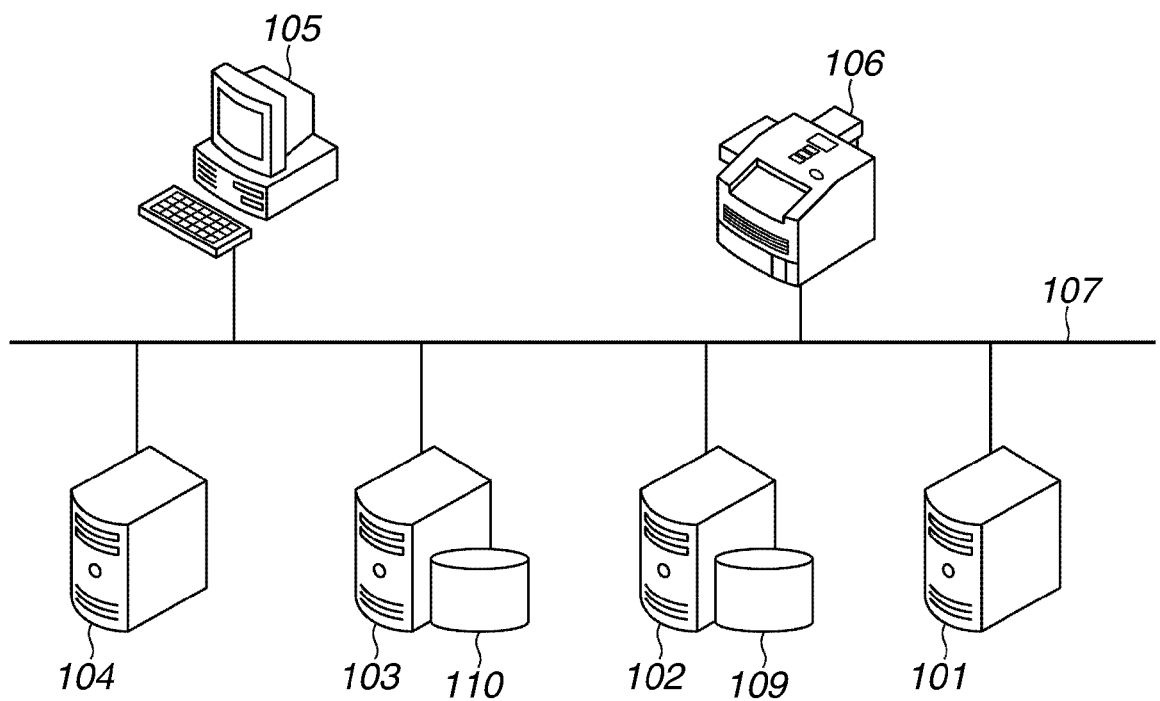
FIG. 1 illustrates an embodiment of a configuration of a network system including a document management apparatus.

FIG. 1 illustrates an embodiment of a configuration of a network system including a document management apparatus according to the present invention.

In the embodiment shown in FIG. 1, an authentication server 101, a document management apparatus 102, a project management apparatus 103, a monitor apparatus 104, an information processing apparatus such as a client personal computer (PC) 105, and an image forming apparatus 106 such as a multifunctional peripheral (MFP) and a copy machine are connected to each other via a network 107.

The authentication server 101 receives a user's identification (ID) and password from the client PC 105 or the image forming apparatus 106, and performs authentication. When the authentication succeeds, the user can use resources in the system such as the document management apparatus 102 and the image forming apparatus 106. The document management apparatus 102 manages a document DB storing the document information, and the project management apparatus 103 manages a project DB 110 storing information about a great number of projects.

When the user logs into, for example, a Web application that manages a document and operates in the document management apparatus 102 via a Web browser from the client PC 105, attribute information about the user who has logged in can be input into the document management apparatus 120. The user information may be transmitted from the client PC 105, or the user information managed by the authentication server 101 may be transmitted. Further, a keyword for searching the document information that the user inputs via the client PC 105 is transmitted to the document management apparatus 102, and the document management apparatus 102 performs an operation including search processing based on the input information. Results of the operation may be displayed on the Web browser of the client PC 105.

With reference to the embodiments shown in FIGS. 2 and 3, a hardware configuration that may be used in the image forming apparatus and the information processing apparatus according to aspects of the present invention will be described.

Figure 2:
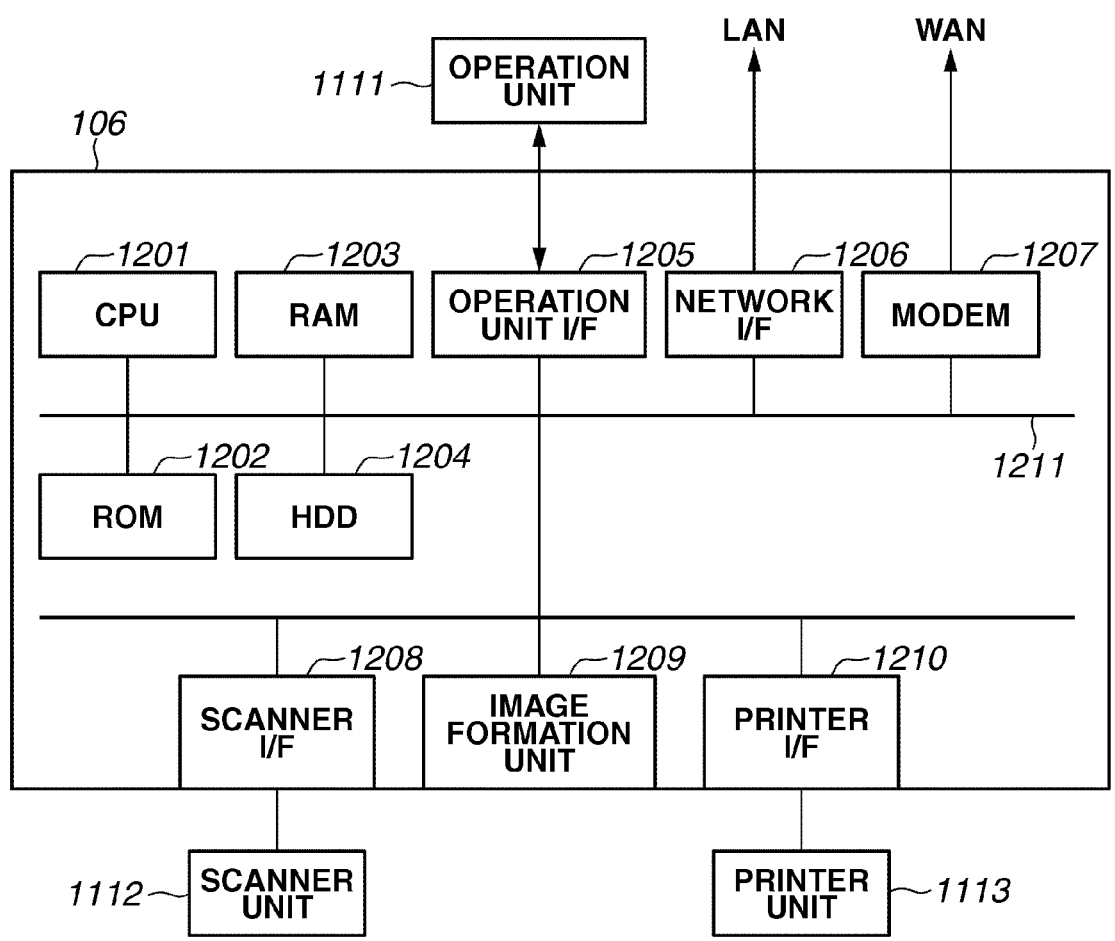
FIG. 2 illustrates an embodiment of a hardware configuration of an image forming apparatus.

The image forming apparatus 106 in the embodiment shown in FIG. 2 includes a scanner unit 1112 as an image input device and a printer unit 1113 as an image output device. Further, the image forming apparatus 106 includes a central processing unit (CPU) 1201 that controls an operation over a whole apparatus, and an operation unit 1111 as a user interface (UI).

The CPU 1201 can comprehensively control access to various devices connected thereto and may control various processing of internal hardware based on a control program and/or computer-executable instructions stored in a read-only memory (ROM) 1202. The ROM 1202 stores a program for booting the apparatus. A random access memory (RAM) 1203 is a system work memory for enabling the CPU 1201 to operate and for temporarily storing image data. The RAM 1203 includes a static random access memory (SRAM) which can retain stored contents even after the power is turned off, and a dynamic random access memory (DRAM) in which stored contents are deleted after the power is turned off. A hard disk drive (HDD) 1204 can store system software and the image data.

An operation unit interface (I/F) 1205 connects a system bus 1211 to the operation unit 1111. The operation unit I/F 1205 receives the image data to be displayed on the operation unit 1111 from the system bus 1211 and outputs to the operation unit 1111, and also outputs information input from the operation unit 1111 to the system bus 1211.

A network I/F 1206 is connected to a local area network (LAN) and the system bus 1211 to input and output the information. A modem 1207 is connected to a wide area network (WAN) and the system bus 1211 to input and output the information.

A scanner I/F 1208 corrects, processes and edits the image data received from the scanner unit 1112. The scanner I/F 1208 determines whether the received image data of a document is color or monochrome, and a text or a picture. A determination result is attached to the image data. Such attached data is referred to as attribute data.

The scanner unit 1112 inputs reflected light acquired by exposing and scanning an image on the document into a charge coupled device (CCD) to convert the image information into an electric signal. Further, the scanner unit 1112 converts the electric signal into luminance signals including red (R), green (G), and black (B) and outputs the luminance signals as the image data. The document is set on a document feeder. When the user gives an instruction for starting to read from the operation unit 1111, the instruction for reading the document is transmitted to the scanner unit 1112.

When receiving the instruction, the scanner unit 1112 feeds and reads the document one by one from the document feeder. The document may be read not only by automatically feeding from the document feeder, but also by scanning the document with an exposure unit which moves over the document placed on a glass surface.

An image formation unit 1209 changes direction of the image data, and compresses and extends an image. Further, the image formation unit 1209 has a function for interpreting a page description language (PDL) and receives PDL data instructed by a computer connected to the LAN 150 and converts the PDL data into bitmapped image data.

A printer I/F 1210 receives the image data transmitted from the image formation unit 1209 and forms an image of the image data while referring to the attribute data attached to the image data. The image of the image data is formed on a sheet and output by the printer unit 1113. As a method for forming an image, the exemplary embodiment adopts an electronic photograph method using a photosensitive drum and a photosensitive belt. However, the present invention is not limited to such as electronic photograph method. For example, an ink jet method for printing on the sheet by ejecting ink from a minute nozzle array can also be adopted.

A user's instruction to the image forming apparatus 106 or an information presentation to the user may be performed, for example, via the operation unit 1111 or the client PC 105 connected via the LAN.

The image forming apparatus 106 may have a copy function, a facsimile function, and a data transmission function for reading a document image and transmitting the read image data to each apparatus on the LAN. Further, the image forming apparatus 106 can store the image read by the scanner unit 1112 and the PDL data instructed by the computer connected to the LAN in a specific region of the HDD 1204 in the image forming apparatus 106.

Figure 3:
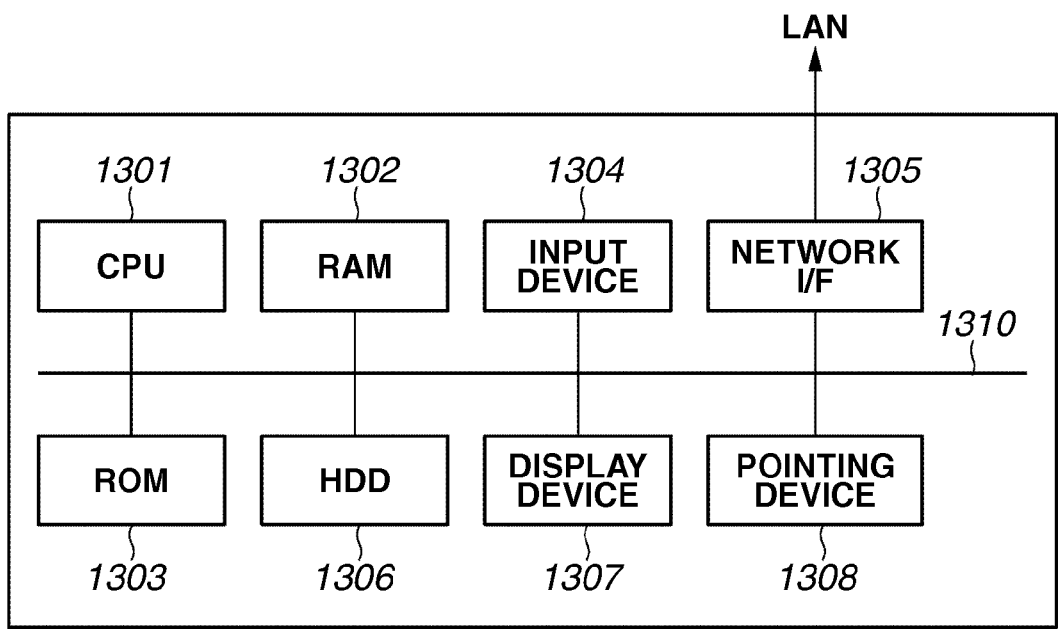
FIG. 3 illustrates an embodiment of a hardware configuration of an information processing apparatus.

FIG. 3 is a block diagram illustrating an embodiment of a hardware configuration of the information processing apparatus.

In the embodiment shown in FIG. 3, a CPU 1301, a RAM 1302, a ROM 1303, an input device 1304 such as a keyboard, a network I/F 1305, and an HDD 1306 are communicably connected to each other via a system bus 1310.

A display device 1307 such as a cathode ray tube (CRT) and a pointing device 1308 such as a mouse are communicably connected to each other via the system bus 1310.

The ROM 1303 or the HDD 1306 stores a control program in advance. The CPU 1301 reads out the control program from the ROM 1303 or the HDD 1306 onto the RAM 1302 to execute, and implements the functions as the computer.

Further, the CPU 1301 displays various types of information via the display device 1307 and receives the user's instruction from the input device 1304 or the pointing device 1308. Furthermore, the CPU 1301 communicates with other apparatus on the LAN via the network I/F 1305.

Figure 4:
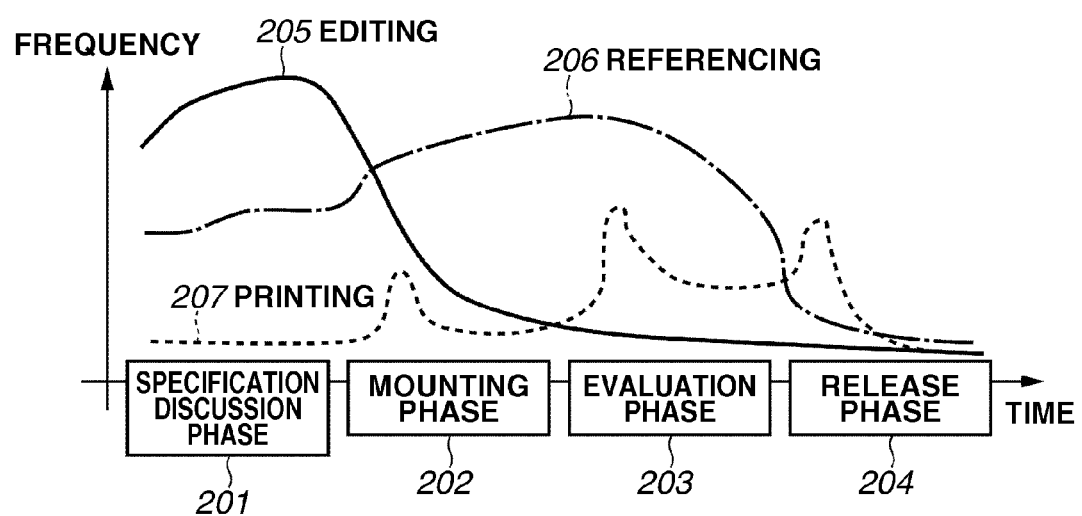
FIG. 4 illustrates examples of frequencies of operations on document information in each phase of a given project.

FIG. 4 illustrates one example of how the user operates document information and how operation frequency changes according to the transition in phase of a specific development project. The graph in FIG. 4 illustrates, as an example, a usage status of functional specifications of the product in a product development project.

A lateral axis indicates a time, and a vertical axis indicates a frequency. The lateral axis indicating the time illustrates the transition of the phase of the product development project. The example includes four phases, i.e., a "specifications discussion phase" 201, a "mounting phase" 202, an "evaluation phase" 203, and a "release phase" 204. A curve illustrates temporal change in the frequency of the operation performed on the document. Curves 205, 206, and 207 respectively illustrate editing, referring, and printing. As illustrated by the curves, frequencies of the operations are changed according to the transition of the phase.

More specifically, in the specifications discussion phase, members working on the specification take into consideration product planning and user's requirements and have discussions to generate the best specifications within designing restrictions. Thus, the members repeat editing of the functional specifications, and the number of times the editing operation is performed increases. Other members may not be included in the specification discussion, but may refer to the functional specifications to estimate the man-hours required for mounting based on the specifications.

Since the specifications are not fixed at this point, hardly any printing is performed for the purpose of distribution at a conference or an announcement to related departments. Therefore, a number of times the printing operation is performed is nearly none.

However, when the functional specifications are fixed, and the phase of the project undergoes a transition to the next mounting phase, the operations to be performed on the functional specifications are changed. For example, once the functional specifications are fixed, less editing is performed. Instead, the members working on the mounting phase as well as other involved members may refer to the functional specifications more frequently to confirm the fixed specifications. Further, in a mounting phase, a meeting for reviewing the specifications may be held and printing may be performed.

Therefore, compared to the previous phase, the number of times the referring and printing operations are performed increases. Thereafter, hardly any editing may be performed, while the number of times the referring operation is performed may increase until the evaluation phase is performed. Since a meeting for reviewing the functional specifications may be held when the phase undergoes a transition, the printing operation may be performed every time a meeting is held. In the release phase, namely the last phase, hardly any functional specifications may be used.

As described above, since the contents of work generally change with passing time, the phase may be defined by a certain unit of the contents of the work. Further, what work is performed in what phase may be determined so that the work proceeds. More specifically, in the specification discussion phase, the product specifications may be discussed and fixed details can be described as the specifications.

Along with the discussion, the functional specifications may frequently be referred to and edited. Further, in the next mounting phase, since the functional specifications may be used for mounting work, the number of times the fixed functional specifications are referred to and printed may be increased, while less editing may be performed. Thus, the operations performed on the document information which is used for the work may be different in each phase, and an operation frequency may also be different depending on the phase.

Aspects of the present invention relate to the change of the frequency of each operation performed on the document information as the project phase undergoes a transition, and applies the change of the frequency to a document search.

Figure 5:
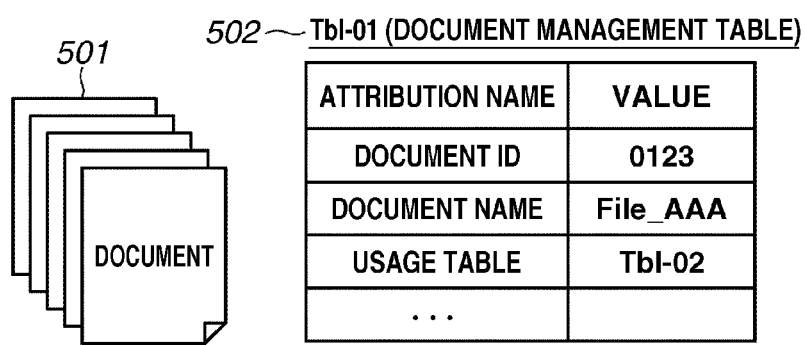
FIG. 5 illustrates an example of a management table of the document information in a document database (DB).

FIG. 5 illustrates an example of a management table for the document information in the document DB 109. The document DB 109 stores and manages a great amount of document information 501. A document management table "Tbl-01" 502 is allocated for each piece of the stored document information 501. The document management table 502 includes a document ID, a document name, and which usage table corresponds to the document information. An example in FIG. 5 illustrates that the document information of the document ID "0123" corresponds to a usage table "Tbl-02".

A usage table 503 indicates the project phases in columns and the operations in lines, and records how many times and what operations are performed in each phase. Taking an example illustrated in FIG. 4, a phase 1, a phase 2, a phase 3, and a phase 4 respectively represent the specification discussion phase, the mounting phase, the evaluation phase, and the release phase. Further, an operation 1, an operation 2, and an operation 3 respectively represent the editing, referring, and printing operations.

According to the usage table 503 in FIG. 5, for example, the editing operation is performed 15 times in the specification discussion phase, and the referring operation is performed 10 times in the mounting phase.

Next, an example of a process for generating the usage table 503 summarizing the usage of the document information will be described.

The document information 501 may be managed by the document management apparatus 102, and can identify an operation performed by the user on the document information. For example, when the user accesses the document information and saves a modification added thereto, it can be recognized that the document information has been edited. Further, when the user opens the document information without saving, it can be recognized that the document information has been referred to.

As another example, some users may copy the document information to the client PC. A case where the document information is simply copied from the document management apparatus to the client PC may be considered to be a referring operation. When the referred document information is overwritten with the same name, or is additionally saved with a different name, the operation may be considered to be an editing operation. The document management apparatus 102 can make an analysis to find out which operation is performed.

When the document information is printed by the image forming apparatus 106, the monitor apparatus 104 acquires job log information including a document name, a name of the user who gives the printing instruction, print settings and a number of printouts from the image forming apparatus 106. The job log information can be analyzed to find out how many times the document information has been printed.

The number of times printing operations have been performed may be analyzed based on monitor information about a print request made by resident software in each client PC 105. Further, the resident software can monitor all operations on the document information after the document management apparatus has been accessed, and analyze other operations in addition to the printing operation based on the monitor information.

The monitor apparatus 104 collects monitor information about the document information from each client PC 105, analyzes the information, and transmits the monitor information to the document management apparatus 102. The document management apparatus 102 reflects the transmitted information in the usage table 503. An example of a method for determining which phase each operation on the document information is performed in will be described in detail below. Thus, the document management apparatus 102 may manage the usage of each piece of the document information.

The document management apparatus 102 can perform statistics processing for each phase or each operation based on all usage tables of the document information related to the project to find out a large deviation value.

For example, in the usage table "Tbl-02" 503 illustrated in FIG. 5, the operation 1 is performed 15 times in the phase 1. If the deviation value is larger than others, it can be said that the operation in the phase is relatively frequent compared to another document.

By using the usage status as described above, the document information having a characteristic usage status in a given phase of the project can be extracted. The extracted document information can be registered and managed in a related document table 603 as described below. Thus, the document which is characteristic in each phase of the project can be extracted.

FIG. 6 illustrates examples of management tables of information about the project in the project DB 110. The project DB 110 may store and manage a great number of projects 601.

A project management table 602 is allocated for each stored project 601. The project management table 602 manages a project ID, a project name and information about other management tables corresponding to the project. More specifically, the project management table 602 may include one or more of a related document table 603, a usage summary table 703, a keyword summary table 704, and the like. The corresponding management tables will be described in detail below.

For example, FIG. 6 illustrates the project management table "Tbl-03" for a project having a project ID of "PRJ-001" and a project name of "Project-X". A related document table "Tbl-04" corresponds to the project management table "Tbl-03".

According to the related document table 603 "Tbl-04" as illustrated in FIG. 6, four documents having document names of "ABCD", "EFGH", "IJKL", and "MNOP" are related to the project. The usage tables for these documents are respectively "Tbl-02-1", "Tbl-02-2", "Tbl-02-3", and "Tbl-02-4". The usage tables include information in the form as described above.

Figure 9:
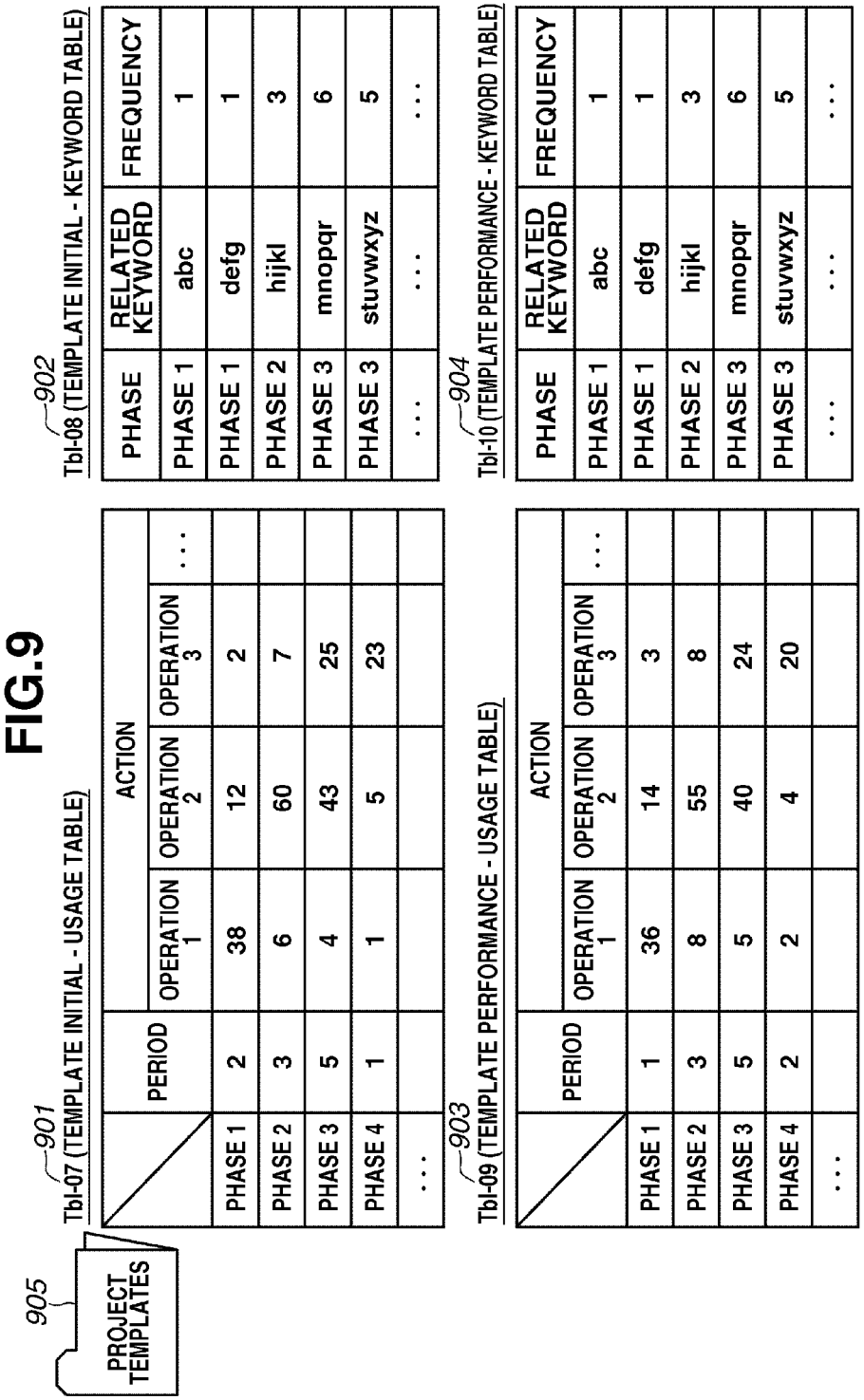
FIG. 9 illustrates examples of project templates managed by a project management apparatus.

FIG. 9 illustrates examples of project templates 905 which are managed by the project management apparatus 103 The project templates 905 include a template initial usage table 901, a template initial keyword table 902, a template performance usage table 903, and a template performance keyword table 904. The tables may be used as references for determining the transition of the project phase. An example of determination of the transition of the project phase will be described in detail below.

A template performance usage table "Tbl-09" 903 and a template performance keyword table "Tbl-10" 904 indicate average values of a sum of actual performance values which are obtained when similar projects are performed many times.

Further, in addition to the tables based on the performances, a template initial usage table "Tbl-07" 901 and a template initial keyword table "Tbl-08" 902 that are generated by considering similar points and different points in various projects are used. An administrator may arbitrarily generate the tables by considering any one or more of a number of the phases, a length of a period, and complexity and a scale of the project.

According to the present exemplary embodiment, use of the template performance usage table 903 and the template performance keyword table 904 is prioritized for determining the transition of the phase, so that progress of the project can be determined according to the performance in the past.

FIG. 7 illustrates an example of details for generating a summary table in the project management apparatus by using the management tables illustrated in FIGS. 5 and 6

A usage summary table 703 manages information that tallies up a number of times the operations are performed in each phase in the usage table of the document information about the project. Values are periodically tallied up and statistically managed.

In FIG. 7, the values of the project having the project ID of "PRJ-001" illustrated in FIG. 6 are tallied up. The related document information in the project includes tables "Tbl-02-1", "Tbl-02-2", "Tbl-02-3", and "Tbl-02-4" that are indicated in the related document table "Tbl-04".

The usage summary table "Tbl-05" 703 refers to tables "Tbl-02-1", "Tbl-02-2", "Tbl-02-3", and "Tbl-02-4" and tallies the values of each operation (ACTION 702) in each phase. When referring and tallying are performed, proportional allocation is performed with a weighing value on each document information in the related document table "Tbl-04", and the number of times of each operation is added. For example, a value in each column in the usage summary table "Tbl-05" can be acquired by the following expression: a value in each column=$C[L](M, N) \times K[L]/\Sigma K[L]$ where $C[L](M, N)$ is a value in a column where a phase "M" crosses an operation "N" in a document "L", and $K[L]$ is the weighing value. The weighing value is changed depending on how much the document information affects the usage status of the project.

According to the present exemplary embodiment, the usage summary table is updated based on the tallied values regarding the current phase. For example, since the usage summary table 703 illustrated in FIG. 7 is an example which is currently in the phase 2, the usage summary table 703 tallies the values in the phase 2. Further, a period 701 indicates a length from start to end of the phase, and the period 701 is, thus, calculated when the phase has been ended. Therefore, in this example, the period of the phase 2 is not yet calculated. A unit of the period can be arbitrarily determined, for example, a month can be used.

The project management apparatus 103 tallies keywords that frequently appear in the document information used in the project. Further, the project management apparatus 103 analyzes each piece of the document information in the related document table 603 illustrated in FIG. 6, and extracts the keywords that frequently appear in the document information. A keyword summary table "Tbl-06" 704 is generated by tallying the keywords in each phase.

As described above, according to the present exemplary embodiment, the usage status of the document information about the project and the keywords that frequently appear in the document are tallied and managed for each project.

According to tallying processing of the usage status as described above, the project management apparatus 103 determines whether the phase undergoes a transition.

Based on the usage status of the document information that is periodically collected to update the usage summary table and the keyword summary table, whether the phase has undergone a transition is determined by using the tallied values of each operation that are periodically collected. More specifically, attention is focused on a ratio of the tallied values of the operations 1 to 3.

For example, the tallied values of the operation 1, 2, and 3 in the current phase are 6, 60, and 7 respectively in the usage summary table "Tbl-05" 703 regarding the above described project having the project ID of "PRJ-001". Referring to the values of the operations 1, 2, and 3 in the phase 2 in the template performance usage table "Tbl-09" 903, the tallied values are 8, 55, and 8 respectively. Thus, ratios of the tallied values of each of the operations in the both tables have similar relationships.

Further, it can be read out that a ratio of the lengths of the periods between the phase 1 and the phase 2 in the template performance usage table "Tbl-09" 903 is 1 to 3. More specifically, since the phase 1 of the project having the project ID of "PRJ-001" has the period of "2", the phase 2 can be estimated to have the period of "6".

According to the period that is estimated as described above, when the transition of the phase approaches, it is determined whether the relationship of the ratio in the current phase is similar to the relationship of the ratio in the next phase in the template performance usage table by using the tallied values of each operation (for one time) that are periodically collected and tallied. When it is determined that the relationships are similar to each other, it can be determined that the phase has undergone a transition.

Further, even though it is determined at least once that the phase has undergone a transition, verification may also be performed after the determination to bring back the phase. In this case, the tallied values that are periodically collected and tallied before and after the determination are saved in a predetermined storage region so that the tallied values can be re-calculated when the phase is brought back.

The transition of the phase can also be determined by focusing on the keywords.

When each document (for example, the document names of "ABCD" and "EFGH") related to a target project indicated in the related document table "Tbl-04" 603 is used, the keywords are extracted from the document, and a number of times of appearance is calculated and tallied in the keyword summary table "Tbl-06" 704.

Then, frequencies of appearance of the keywords in the template initial keyword table "Tbl-08" 902 are compared. For example, when the frequency of appearance of a keyword "hijkl" is not increased but the frequency of appearance of another keyword "mnopq" begins to increase, it can be determined that the phase 2 has undergone a transition to the phase 3. It can be determined that a transition timing is when the frequency of appearance of the keyword "hijkl" does not change and the frequency of appearance of the keyword "mnopqr" begins to increase.

As described above, the transition of the phase can be determined by focusing on the change of the frequency of appearance of the keyword for every phase.

Both of the templates of the usage table and the keyword table about the same project are generated so that the transition of the phase can be determined by both of the operational states of the document information and the contents of the operated document information.

When the usage table 503 of each document is tallied to extract the characteristics document information in each phase or each operation as described above, or to determine the transition of the project phase, what range of the document is to be targeted will be described.

In the above description, when the characteristic document information is extracted, all documents related to the project are targeted. On the other hand, when the transition of the project phase is determined, only the document described in the related document table "Tbl-04" 603 is targeted. From an aspect of statistics, in general, the wider the range can be expanded, the more the accuracy can be improved.

According to the present exemplary embodiment, in consideration of processing time, when the characteristic document information is extracted, a method for targeting only a limited range as indicated in the related document table 603 can be adopted, instead of targeting all documents. Further, as indicated in the related document table 603, a method for weighting each document and further extracting the characteristic document information can be adopted. If the documents to be described in the related document table 603 are increased, all documents managed by the document management apparatus 102 are targeted.

The method as described above focuses on one given project, thus, one piece of document information corresponds to one usage table 503. Additionally, one piece of document information can also be used for a plurality of projects.

In this case, the progress of the project phase may be different for each project, and the usage status may also be different for the project. Therefore, the usage table 503 may be prepared for each project. The above-described method may also be performed for each project.

According to the above described method for determining the transition of the project phase, the determination is performed by tallying up the values by a project unit every time the operation is performed on the document and the usage table 503 is updated. Thus, an interval for determination can be set for shortly after the phase undergoes a transition. Then, the interval may be gradually set longer up to the next determination, and may be set shorter again in a latter half of the estimated phase.

When the project ends the last phase, the usage summary table 703 and the keyword summary table 704 in which performance values are tallied up are fed back to the template performance usage table and the template performance keyword table. More specifically, for example, the performance values are added up and averaged for the each operation of the phase to be fed back. Further, for the template performance keyword table 904, the frequency of appearance of each keyword is reviewed, and the keyword appearing in each phase is added or deleted.

Figure 10:
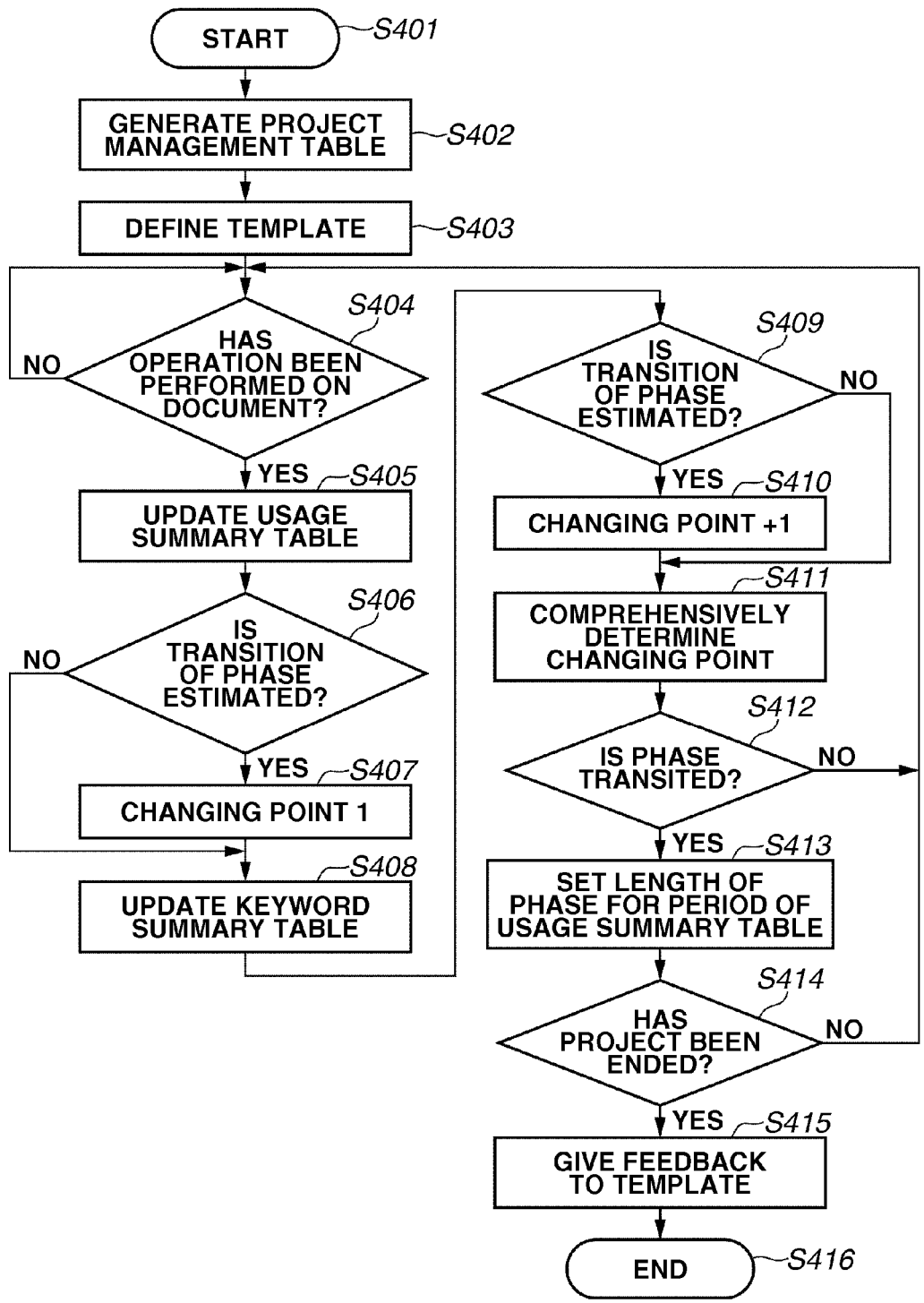
FIG. 10 is a flowchart illustrating example processing performed by the project management apparatus.

An example of a method for determining the transition of the project phase will be described by using a flowchart illustrated in FIG. 10. The processing may be realized by the CPU of the project management apparatus 103 executing a program and/or computer-executable instructions for the processing.

In step S401, the project management apparatus 103 starts the processing for a predetermined project. In step S402, the CPU generates the project management table for managing the project.

In step S403, the CPU determines which template is to be used as a reference for comparing the usage table to the keyword table among the project templates in the project DB managed by the project management apparatus 103, and defines the template in the project management table 602.

The CPU obtains the usage table from a document management server to obtain the usage status of the document information related to the project. In step S404, the CPU determines whether any operations have been performed on the document information.

When it is determined that the operations have been performed (YES in step S404), in step S405, the CPU tallies the operations by a project unit based on the usage table, and updates the usage summary table for each project. When it is determined that that the operations have not been performed (NO in step S404), the processing of step S404 is repeated. In step S406, the CPU analyzes the updated usage summary table and determines whether the phase has undergone the transition.

The CPU may determine the transition of the phase from both the usage summary table and the keyword summary table, as described above. When the transition of phase is determined from the usage summary table indicating the operation on the document information (YES in step S406), in step S407, the CPU sets a change point as "1". When the transition of phase is not determined (NO in step S406), processing proceeds to step S408.

In step S408, the CPU obtains the document information related to the project from the document management apparatus 102 and updates the keyword summary table for each project. In step S409, the CPU analyzes the updated keyword summary table to determine whether the phase has undergone the transition as described above.

When the CPU determines the transition of the phase from the usage summary table indicating the operation on the document information (YES in step S409), in step S410, the CPU adds "1" to the change point. When the transition of phase is not determined (NO in step S409), processing proceeds to step S411.

In step S411, based on the change point, the CPU comprehensively determines whether the phase has undergone the transition. When the change point becomes "2", the CPU determines that the phase has undergone the transition. Instep S412, when the project phase has undergone the transition (YES in step S412), the processing proceeds to step S413. When the project phase has not undergone the transition (NO in step S412), the processing returns to step S404.

In step S413, the CPU sets a length of the phase to the period of the usage summary table as described above.

In step S414, the CPU determines whether the project has ended. When the project is not ended (NO in step S414), the processing returns to step S404. When all phases of the project are ended and the project itself is ended (YES in step S414), the processing proceeds to step S415.

In step S415, the CPU gives the feedback based on the usage summary table and the keyword summary table to the template that is used as the reference for determining the transition of the phase. In step S416, the processing for managing the progress of the project is ended.

Next, an example of the processing performed by the document management apparatus 102 as described above will be described by using a flowchart illustrated in FIG. 11. The processing may be realized by the CPU of the document management apparatus 102 executing a program and/or computer-executable instructions for the processing.

In step S301, the document management apparatus is activated and starts the processing. In step S302, upon receiving a login requirement from the client PC 105, the CPU detects that the user logs in. In step S303, the CPU receives an input search keyword and the attribute of the login user. The attribute of the login user is obtained directly from the client PC 105 or by inquiring the user name of the authentication server 101.

In step S304, the CPU detects a related project from the projects included in the user attribute. When the related project can be uniquely determined from the input keyword, the CPU detects the related project based on the input keyword.

In step S305, the CPU obtains the current phase of the detected project by inquiring of the project management apparatus 103. In step S306, the CPU searches and collects the document information that is searched with the user attribute and the search keyword, and the document information that has a characteristic tendency in a number of the operation times in the current phase.

Figure 8:
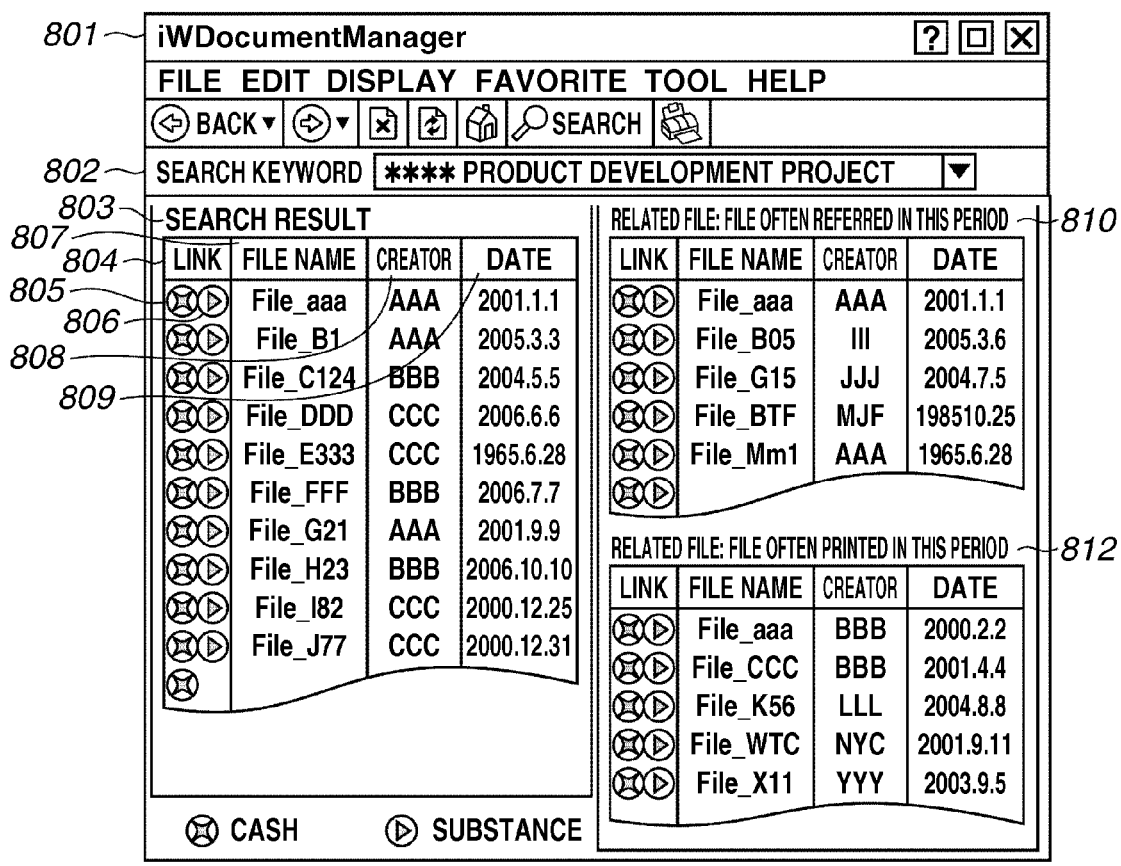
FIG. 8 illustrates an example of a display screen of search results according to an exemplary embodiment of the present invention.

In step S307, in order to display the search results as illustrated in FIG. 8 to the user, the information obtained by the above steps is output. For example, the CPU displays results of full-text retrieval by using the search keyword received from the client PC from among the document information collected in step S306. A specific display screen will be described in detail below.

Then, the CPU waits until receiving the input for operating the document information based on the display of the search results from the user. In step S308, when the operation is detected (YES in step S308), the processing proceeds to step S309. When a logout request is received from the user, or it is determined that no operation has been performed (NO in step S308) the CPU performs logout processing and the processing returns to step S302 to wait the user to log in again.

In step S309, the CPU determines whether a document is newly generated. In case of new document generation (YES in step S309), in step S310, the CPU generates the document management table and the usage table for the document. In cases other than the new document generation (NO in step S309), the processing proceeds to step S311.

In step S311, the CPU analyzes the document information specified by the user and the operation performed thereon. As described above, the details of the operation to be analyzed may be any one or more of editing, referring, and printing.

In step S313, the usage table is updated based on the project phase obtained in step S305 and analysis of the operation performed on the document information in step S311. With this process, the operation that the user has performed on the document information is managed as a history. Then, the processing returns to step S308 and continues to record the history until all the operations to be performed on the document are completed.

FIG. 8 illustrates one example of the display of the search results according to the present exemplary embodiment which is displayed on a screen of the client PC. The display is based on the information received from the document management apparatus 102. An entire screen 801 displaying the search results when the search is performed with the user attribute and the search keyword input by the user includes following elements.

A search keyword bar 802 displays the input search keyword, and a display region 803 displays a list of the document information which is narrowed down and searched only with the search keyword and the user attribute. The search results displayed in the display region 803 are narrowed down and searched by using the search keyword and the user attribute such as the project in which the user is involved and the user name. More specifically, the document management apparatus 102 performs a word search on the attribute information such as the contents and creator of the document information to extract the document information.

The present exemplary embodiment further includes the display regions 810 and 812 for the search results. The display regions 810 and 812 indicate respectively an "OFTEN REFERRED TO" file (document information) and an "OFTEN PRINTED" file (document information).

The display regions 810 and 812 display pieces of the document information for which the number of times each operation has been performed thereon is equal to or more than a predetermined threshold value in the current project. The display may begin from the largest number, and may be performed by referring to the usage table of the document information which is displayed as the search results in the display region 803. The document management apparatus 102 manages the threshold value, which may be, for example, set by the administrator arbitrarily. As described above, the document information on which the unique operation is frequently performed in the current phase can be displayed.

An example of a display format of the display region 803 will be described below. Laterally arranged items include a link 804, a file name 807, a creator 808, and a date 809 from left. The link 804 indicates buttons for searching a link to a searched file. A button 806 is linked to a file on the document DB, and a button 805 is linked to a document existing outside the document management apparatus or to cash information of the document.

As described above, according to the present exemplary embodiment, a list of the search results of the document suitable for the current phase can be displayed without requiring considering of the project at the point when the user logs in the document management apparatus. More specifically, according to the present exemplary embodiment, the project to which the user belongs may be determined from the user attribute when the user logs in, and the project management apparatus can automatically determine the phase of the project.

For example, when the user inputs the keyword of a "description", the display regions 810 and 812 for the search results may have different displays depending on the phase when the user logs in. More specifically, the user who belongs to the similar projects can automatically narrow down and display the document information, which is frequently operated in the phase. At this point, according to the present exemplary embodiment, the user may not need to input the project and the phase as the search keyword for searching the document information, and troublesome works can thus be reduced. Accordingly, aspects of the present invention provide a document management apparatus and a document management method which manages a use status of document information in routine work in the past by associating the past work with current progress of the work, and may enable a user to flexibly search the document information according to progress of a current work (project) when the user uses the document information.

Aspects of the present invention may be applied to a system including a plurality of devices or an apparatus including only one device, such as for example a computer system including a printer, a facsimile, a PC, a server and a client.

A computer readable storage medium having a software program and/or computer-executable instructions for realizing functions according to the above-described exemplary embodiment may be supplied to a system or an apparatus directly or remotely, and a computer included in the system and the apparatus can read and execute the supplied program code and/or instructions so that aspects of the present invention can be achieved.

Accordingly, the computer-readable storage medium having program code and/or computer-executable instructions itself installed into the information processing apparatus to realize the functions and the processing of the present invention by the computer may constitute an embodiment according to the present invention.

In this case, as long as the function according to aspects of the invention is included, any form of the program and/or computer-executable instructions such as an object code, a program performed by an interpreter, and script data supplied to an OS, may be applicable.

A storage medium for supplying the program and/or computer-executable instructions may include, for example, at least one of a flexible disk, a hard disk, an optical disk, a magneto-optic disk (MO), a compact disc read only memory (CD-ROM), a CD-recordable (CD-R), a CD-rewritable (CD-RW), a magnetic tape, a non-volatile memory card, a ROM, and a digital versatile disk (DVD) (DVD-ROM, DVD-R).

Also, the program and/or computer-executable instructions may be downloaded from the web site of the Internet by using a browser of the information processing apparatus of the client. More specifically, the computer program and/or computer-executable instructions itself, or a file that is compressed and includes an automatic installation function, may be downloaded from the web site into the storage medium, such as a hard disk.

Moreover, the program code and/or computer-executable instructions can be divided into a plurality of files and each file may be downloaded from a different web site so that aspects of the present invention can be realized. More specifically, a World Wide Web (WWW) server for allowing a plurality of users to download the program file for realizing functions and processing according to aspects of the present invention can be provided.

The program and/or computer-executable instructions may be encrypted and stored in the storage medium, such as a CD-ROM to distribute to the users. In this case, only the users who satisfy a predetermined condition may be allowed to download key information for decrypting from the web site via the Internet. The user may decrypt the encrypted program by the key information to perform and install the program and/or computer-executable instructions in the information processing apparatus.

A computer may execute the read out program stored on the computer readable storage medium to realize functions according to the above-described exemplary embodiment. Based on an instruction, the OS running on the computer may perform a part of or all actual processing. In this case, the functions of the above-described exemplary embodiment can be realized.

The program and/or computer-executable instructions read out from the storage medium may also be written into a memory provided in a function extension board inserted into the information processing apparatus, or a function extension unit connected to the information processing apparatus. According to the instruction of the program and/or computer-executable instructions, the CPU included in the function extension board or the function extension unit may perform a part of or all of the actual processing, and realize the functions of the above-described exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-149362 filed Jun. 6, 2008, which is hereby incorporated by reference herein in its entirety.

What is claimed is:

1. A document management apparatus in a system that includes a project management unit capable of managing progress of a project to which a user belongs, the document management apparatus comprising a processor, functioning as:

a reception unit configured to receive a search keyword input by the user and user attribute thereof;
   a search unit configured to search document information based on the search keyword received by the reception unit;
   an obtaining unit configured to detect the project to which the user belongs based on the user attribute received by the reception unit, and obtain a phase of the detected project from the project management unit;
   an extraction unit configured to extract document information which is operated on a number of times that is equal to or more than a threshold value for each type of operation in the project phase obtained by the obtaining unit, from the document information searched by the search unit; and an output unit configured to output the document information searched by the search unit and the document information extracted by the extraction unit to provide the user therewith, wherein the output unit outputs the document information extracted by the extraction unit such that the document information is sorted and provided to the user by the type of operation, and wherein an operation performed on the document information is any one or more of referring to, editing, and printing of the document information.

2. The document management apparatus according to claim 1, further comprising:

an analysis unit configured to analyze an operation performed by the user on the document information output by the output unit; and a management unit configured to manage a history of the operation that is analyzed by the analysis unit and performed by the user on the document information.

3. The document management apparatus according to claim 1, wherein the project is a development project for developing a product; and wherein the progress of the product development project is managed by a specification discussion phase, a mounting phase that performs a product-mounting based on the fixed specifications, an evaluation phase and a release phase.

4. A method for managing a document of a document management apparatus included in a system that manages progress of a project to which a user belongs, the method comprising:

receiving a search keyword input by the user and user attribute thereof;

searching document information based on the received search keyword to obtain searched document information;

detecting the project to which the user belongs based on the received user attribute and obtaining a phase of the project;

extracting document information which is operated on a number of times that is equal to or more than a threshold value for each type of operation in the obtained project phase from the searched document information to obtain extracted document information; and outputting the searched document information and the extracted document information to provide the user therewith, wherein the extracted document information is output such that the document information is sorted and provided to the user by the type of operation, and wherein an operation performed on the document information is any one or more of referring to, editing, and printing of the document information.

5. The method according to claim 4, wherein an operation performed on the document information is any one or more of referring to, editing, and printing of the document information.

6. The method according to claim 4, further comprising:

analyzing an operation performed by the user on the output document information; and managing a history of the analyzed operation performed by the user on the document information.

7. A computer readable storage medium having computer-executable instructions stored thereon for causing a document management apparatus in a system that includes a project management unit capable of managing progress of a project to which a user belongs to perform a method for managing a document, the computer readable storage medium comprising:

computer-executable instructions for receiving a search keyword input by the user and user attribute thereof;

computer-executable instructions for searching document information based on the received search keyword to obtain searched document information;

computer-executable instructions for detecting the project to which the user belongs based on the received user attribute and obtaining a phase of the project;

computer-executable instructions for extracting document information which is operated on a number of times that is equal to or more than a threshold value for each type of operation in the obtained project phase from the searched document information to obtain extracted document information; and computer-executable instructions for outputting the searched document information and the extracted document information to provide the user therewith, wherein the extracted document information is output such that the document information is sorted and provided to the user by the type of operation, and wherein an operation performed on the document information is any one or more of referring to, editing, and printing of the document information.

* * * * *